Jan. 22, 1952    W. J. VAN HEECKEREN    2,583,311
HOT-GAS MOTOR WITH MEANS FOR CONTROLLING
THE HEAT SUPPLY THEREFOR

Filed Sept. 5, 1945                               2 SHEETS—SHEET 1

INVENTOR

WILLEM JAN VAN HEECKEREN

BY

ATTORNEY

INVENTOR
WILLEM JAN VAN HEECKEREN
ATTORNEY

Patented Jan. 22, 1952

2,583,311

UNITED STATES PATENT OFFICE 2,583,311

HOT-GAS MOTOR WITH MEANS FOR CONTROLLING THE HEAT SUPPLY THEREFOR

Willem Jan van Heeckeren, Eindhoven, Netherlands, assignor to Hartford National Bank & Trust Co., Hartford, Conn., as trustee Application September 5, 1945, Serial No. 614,570
In the Netherlands May 25, 1943

Section 1, Public Law 690, August 8, 1946
Patent expires May 25, 1963

8 Claims. (Cl. 60—24)

This invention relates to means for controlling the supply of heat to a hot-gas engine.

The term "hot-gas engine" is to be understood in this case to mean a thermo-dynamic power machine wherein a thermo-dynamic cycle is traversed by an amount of gas enclosed in a space of variable volume. In this volume or in open communication therewith is a heating portion, which may be a regenerator, and a cooling portion which is, in addition, inside or in open communication with a second space of variable volume. The space adjoining the heating portion is termed a "hot space or chamber" and that adjoining the cooling portion is termed a "cold space or chamber."

A portion of the amount of gas enclosed in the said spaces or chambers, if necessary, may be admitted into one or a plurality of separate closed tubes or vessels and, afterwards, admitted again into the said spaces from one or a plurality of these tubes or vessels. In all these cases the thermo-dynamic cycle is termed "closed cycle."

The cooling portion of the motor may, if desired, be omitted and replaced by a periodic communication with the atmosphere, in which case a new quantity of air must be drawn-in for each cycle. Motors of this kind are termed "motors with open cycle." In motors with open cycle as well as in those with closed cycle there exists between the variations in volume of the hot and cold spaces such a phase difference that the gas is subjected successively to heating, expansion, cooling and compression.

The efficiency with which the above-described hot-gas motors can convert energy from heat into mechanic work is indicated in the ideal case by the fraction $$\frac{T_1 - T_2}{T_1}$$

in which $T_1$ is the temperature of the working medium in degrees Kelvin at the hot side and $T_2$ that at the cold side. Since in practice $T_2$ is dependent on the temperature of those serviceable cooling agents which are of most frequent occurrence on earth, i. e. water and air, it is necessary in obtaining a high efficiency to aim at a high value of $T_1$. This aim is limited however, by the strength of those portions of the hot-gas motor which are in contact with the hot medium. These portions cannot be given an unlimited and great thickness either on account of undesirable dissipation of heat if a communication with colder portions is made, or on account of undesirable resistance to heat flow in the case where a wall is used to separate media having to exchange heat. On these grounds of consideration a compromise is made between the maximum permissible temperature and the wall thickness with a given construction material, based on the highest pressure that is to be expected in the machine during operation. In known hot-gas motors the means utilized to prevent collapse of the wall used, as mentioned above, due to the high heating during operation are not very satisfactory.

In one of the known arrangements the power produced by the hot-gas motor is varied by varying the amount of heat which is supplied by the source of heat to the motor. The maximum capacity of the source of heat is limited in such manner that at the highest load the material does not collapse. Consequently, at this load the efficiency is maximum, at lower loads it decreases.

In another known arrangement wherein the heat source is a burner for liquid or gaseous fuels, the heat source is adjusted to a constant capacity. In this case the temperature at the hot side of the motor varies inversely with respect to the power evolved by the motor; the power evolved being controlled in another manner. Consequently, in this case the highest temperature and the highest efficiency precisely occurs with no-load; with an increase in load the efficiency decreases.

In a third known arrangement it is endeavoured to maintain the temperature of the heated material constant by maintaining the wall at a certain degree of red incandescence as viewed by the eye. The unreliability of such a control needs no further explanation. Another known form of control consists in using the temperature of the flue gases for the control of the chimney draught, after these had given off their heat to the heater. However, this arrangement does not lead to the object in view either, since at small loads of the machine the temperature of the flue gases will differ less from that of the material to be heated than at a larger load.

In all arrangements hitherto known for the control of temperature of the heater material as a function of either the power of the motor or of the amount of heat supplied to the motor, there appears at any given time to be a mathematical relation between the motor power and the temperature of this heater material, even though this temperature decreases or increases with an increase in power of the motor, as the case may be, or varies irregularly therewith.

The effective power of a piston machine is expressed by the form $N = f \times P_m \times n$, $P_m$ being the average effective pressure on the piston and $n$ the number of revolutions per second. The factor $f$ is dependent on the various constructional magnitudes of the machine. It appears therefrom that for a given definite value of the effective power N a definite value for $P_m$ is not fixed (since it varies inversely with $n$ if $f$ is also constant), so that a definite pressure load in the cylinder is not to be expected. Consequently, the maximum pressure load may be expected at any value of the effective power and, hence, in the known control arrangements, the temperature of the heater material must at any time be limited in such manner that the strength limit of this material set for this temperature is not exceeded.

A primary object of this invention is to overcome all the problems mentioned above.

Another object of this invention is to provide a hot-gas engine in which the ideal efficiency expressed by the fraction $$\frac{T_1 - T_2}{T_1}$$

is approached.

Still another object of this invention is to provide a hot-gas engine in which the temperature of the heater is governed by the average working pressure of the engine proper.

Another object of the invention is to provide means in a hot-gas engine for raising or lowering the internal engine pressure without the aid of the pressure of the medium heated by the heater itself to increase the engine efficiency.

A further object of this invention is to provide in a hot-gas engine a pressure responsive device coupled to a temperature responsive device, the combined output of which is coupled to an electric regulating device for controlling the heat input to the heater of the subject engine.

Figure 1:
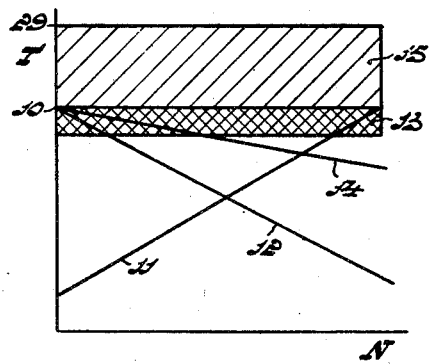
Fig. 1 shows the variations of the thermal efficiency with several load positions according to several known arrangements and according to the invention.

In the arrangement according to the present invention the temperature of the heater material is controlled by controlling the flow of heat supplied from the heat source in accordance with the average pressure of the working medium in the motor by which the weakest portion of the engine structure is loaded, and this is done in such manner that the temperature of this weakest portion acquires a value which ensures sufficient strength or resistance to deformation at the pressure which occurs.

The required data about the strength of various materials as a function of temperature are sufficiently known from experiments for a whole series of materials entering into consideration for the manufacture of parts used under the extreme heat of a hot-gas motor. In constradistinction to the known arrangements, the temperature of said weakest engine portion according to the invention is thus a function of the average pressure load exerted thereon. The arrangement according to the invention has the advantage that at comparatively low average pressures the highest temperature of the working medium and hence the efficiency may be increased with respect to known hot-gas motors. On the other hand, by utilizing the present invention, a higher average pressure is permissible. This implies that the torque of the crankshaft may also increase, this pressure being higher that the maximum average pressure permissible for known hot-gas motors of similar construction, provided that the temperature of the heater material is controlled to a lower level. It is evident that in this case a decrease in efficiency cannot be avoided.

According to another embodiment of the invention, it is possible to bring about an increase of the product of the average effective pressure $P_m$ and of the number of revolutions $n$ to such an extent that at such time the full-load power N considered before as a maximum is exceeded, which implies that the output demanded from the heat source lies also above its normal full-load. The term "normal full-load" of the heat source means the highest load which cannot be exceeded without the burner being permanently affected thereby. Full-load is to be considered, for example, the load at which the fuel supplied to the heat source and the combustion air ensure as complete a combustion as possible, and at which no undesirable fuel particles or combustion constituents follow the path of the flame and at which the component parts of the combustion device or the like are not heated to a temperature higher than that which is permanently permissible. The question as to what degree and how long an overload of the source of heat is permissible depends on the degree to which the phenomena is detrimental to the material of the burner. Production of combustible gases in the chimney gases causes efficiency losses, it is true, but it is of not too much importance if the gases are formed during overload as long as this overload is not of a too long duration. On the other hand, the occurrence of incombustible accumulations of dust in the flame paths is objectionable even with frequent occurrence of short-time overloads.

In order that the invention may be more clearly understood and readily carried into effect, it will be described more fully with reference to a few material characteristics and a constructional example.

Fig. 1 graphically shows for several cases the relation which exists between the temperature of the hot side of the hot-gas motor and the motor power produced. All cases are assumed to be applicable to a hot-gas motor of identical construction and similar variation of the maximum permissible load of the heater material with an increase in temperature. As the highest temperature which may occur in these hot-gas motors is reached (i. e. the highest temperature which may occur) in view of the maximum gas-pressure to be expected (during operation of the motor), the temperature thereof is indicated by 18 in Fig. 1. The surface 13 hatched in a crosswise manner shows the region in which the temperature varies when use is made of a control wherein the heater is maintained at approximately constant temperature. In this case this temperature will arbitrarily vary within this region, independently of the power. The line 12 represents the case wherein the amount of heat supplied is maintained constant, independently of the magnitude of the power desired. Consequently, in this case the temperature of the heater material decreases with an increase in indicated power. The temperature of the heater varies in accordance with the line 11 when the control of power is solely effected by varying the flow of heat supplied. If the control of temperature of the heater is derived from the temperature of the flue gases which have given off their heat to the motor this temperature will vary in accordance with the line 14. From the foregoing it appears that in all these known cases the highest temperature that occurs, and hence the maximum efficiency obtainable of the motor, can never be higher than the temperature limit 10. However, when using the arrangement according to the invention, a still larger region is disclosed, i. e. that which is indicated by the hatched surface 15. This shows that by decreasing the pressure in the cylinder the temperature may, if desired, be raised to a height 29.

To carry out this invention use is made of the relation which exists between the temperature of a material and the strength thereof at this temperature, since it is a known fact that nearly all usable materials have a strength which decreases with an increase in temperature. The curves 16 and 17 show the graph of the variation of this strength K, plotted on the ordinate of the system, in accordance with the temperature T, which is represented by the abscissa of this system. These temperature-strength curves show a relation between the temperature of the material and the strength at this temperature. The relation between the strength K and the absolute temperature T is, as a rule, according to an equation of the character $K^m = C \times T^n$ in which $m$ and $n$ are dependent on the material. In the two cases shown in Fig. 2 for the material 16, $m$ is greater than $n$, and for the material 17, $m$ is smaller than $n$.

Figure 2:
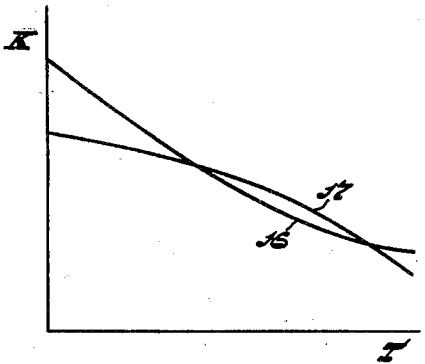
Fig. 2 shows the relation which exists between strength and temperature for two different materials.

A chrome-nickel steel material having a temperature-strength curve according to 17 is shown in Figure 2 by way of example. At 200° C. the strength is 54 kgs./mm.², which practically remains unchanged up to 400° C. At 500° C. the strength is 49 kgs./mm.², at 600° C. 39 kgs./mm.², at 700° C. 29 kgs./mm.² and at 800° C. 18 kgs./mm.². With a decrease in temperature from 700° C. to 400° C. the strength thus increases up to 190%.

Figure 3:
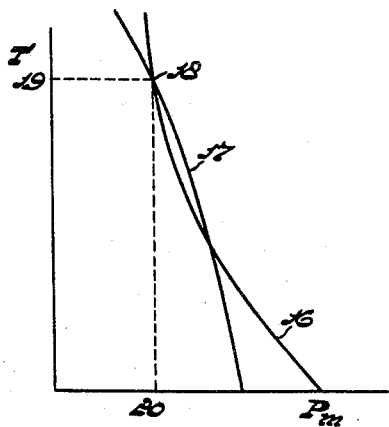
Fig. 3 shows the relation which by utilizing the invention exists between the temperature and the permissible average pressure.

With the aid of these temperature-strength curves of several materials it is possible to draw the curve shown in Fig. 3 giving the relation between the highest average pressure permissible in the cylinder and the temperature of the weakest heated portions of this cylinder. From this Fig. 3 it appears that the two materials 16 and 17 will give different results. If in a definite point 18, for which, for example, the normal full-load working point of the motor is chosen at a definite temperature 19, a definite average pressure 20 is permissible, the material 16 with a decrease in temperature will permit a greater increase in pressure than the material 17. It appears from the characteristic curve shown that with a small decrease in temperature the material 16 will have an even somewhat greater strength, but, this region is of little importance for the control since the greater increases in pressure play an important part.

Figure 4:
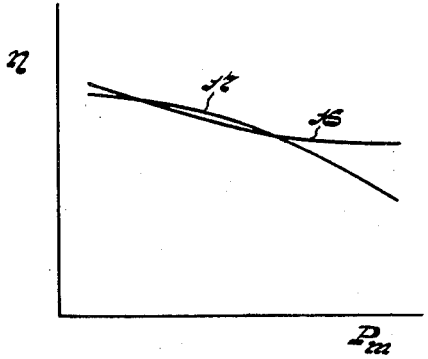
Fig. 4 shows for the same case the relation which exists between the ideal thermal efficiency and the gas pressures which occur.

From Fig. 4 it appears how the thermal efficiency $n$ of the ideal hot-gas motor, i. e., without losses $$= \frac{T_1 - T_2}{T_1}$$

and depends on the average pressure $P_m$ permissible, as before for different materials 16 and 17. In fact, the necessary decrease in temperature resulting from Fig. 3 with an increase in average pressure necessarily results also in a decrease of the thermal efficiency and since the necessary minimum decrease in temperature has been found to be dependent on the material used, the variation in efficiency will also depend in a similar manner on the properties of the material. Consequently, from Fig. 4 it appears that in the most important region the material 16 will give somewhat better results than the material 17.

Figure 5:
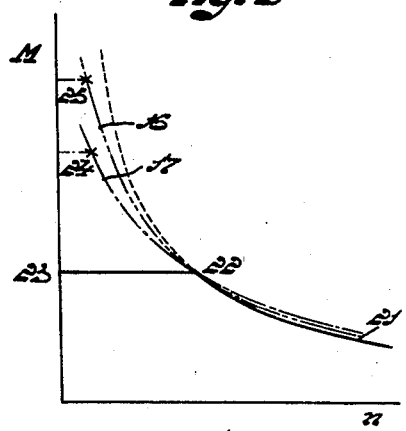
Fig. 5 shows, both with and without the use of the invention, the relation which exists between the torque that occurs and the speed of a hot-gas motor.

Fig. 5 shows the relation which exists between the torque M and the speed $n$ of a known hot-gas motor for a definite maximum power which is represented by the full line 21—22—23. In the region of the low speeds, i. e. on the line 23—22, the maximum torque of the motor shaft is determined by the maximum average pressure permissible in the cylinder so that the output then lies below the full-load power. In point 22 the product of this greatest torque and of speed is exactly equal to the full-load power, i. e. equal to the working equivalent of the supply of heat. Since the product of speed and of torque cannot exceed this value, an additional increase in speed must necessarily result in a decrease of the torque. This is represented by the hyperbolic form of the curve 22—21. That portion of the hyperbolic curve which is located above the point 22 and which is shown in dotted lines in the figure is not usable since it is located in a region of higher average pressures than those which are permissible from a constructional point of view at the temperature of the material which must be reckoned. Consequently, the known hot-gas motors are bound to a maximum torque of the order of magnitude indicated at point 23 in Fig. 5.

For several purposes such, for example, as for traction and for lifting machines, it is highly desirable at least during a portion of the operating time to have at one's disposal a power device yielding much greater torque than the value normally required. Definite drawbacks which might be involved by the occurrence of this greater torque may be taken into the bargain in view of the short time in which this torque actually occurs. Thus, for example, a decrease in efficiency during the occurrence of this greater torque need not necessarily constitute any great objection.

By applying the invention to a hot-gas motor having the characteristic curves as shown in Fig. 5, the desired increase of torque may be obtained, though at the expense of a decrease in efficiency. As appears from Fig. 3, the average pressure $P_m$ may be raised if at the same time the temperature of the heater material is reduced. This relation between increase in pressure and decrease in temperature is dependent on the material used, which is shown by the curves 16 and 17 in Fig. 3. For these materials the curves 16 and 17 in Fig. 5 show the variation of the motor power with a decrease in temperature and an increase in average pressure. If the heated parts of the motor are made from the material 16, the maximum torque 25 may be obtained at a definite speed, the material 17 only permitting a smaller maximum torque 24 at the same speed. Since, however, as appears from Fig. 4, the efficiency decreases with an increase in average pressure, also as a function of the material used, the points 24 and 25 will not lie on the initial hyperbolic curves 21 and 22 but somewhat at the left thereof, since the output decreases by a decrease in efficiency.

From Fig. 5 it further appears that under these conditions the material 16 is the more advantageous material for the manufacture of the heated parts of the motor, since it permits obtaining the smallest decrease in output and, in addition, the greatest torque. From Fig. 2 it appears that those materials are more advantageous wherein a ratio exists between the strength and the temperature expressed by an equation in which a limit of the strength is inversely proportional to temperature. This is graphically shown by the curve related to the most advantageous material. In this case the indication 16, has a curved shape, the convex side being adjacent the zero of the system of axes on which this temperature and strength are plotted. With the use of the chrome-nickel steel previously referred to and a permissible decrease in temperature of from 700° to 400° C., the average indicated pressure may increase up to 190%. In this case the theoretical efficiency decreases, however, so that ultimately the efficient torque may become about 1.7 as great.

Figure 6:
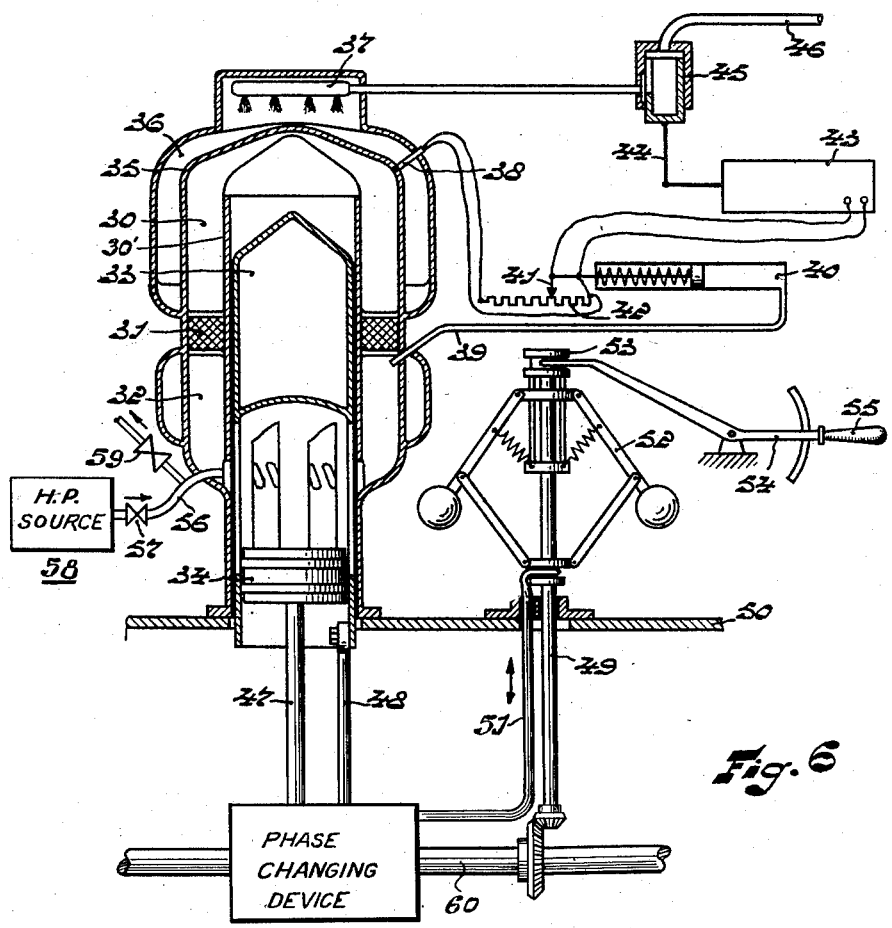
Fig. 6 shows in part diagrammatically a constructional form of a hot-gas motor embodying the invention.

Fig. 6 shows the form of construction of a hot-gas motor to which the present invention is applicable. The motor itself is built up from a cylinder 30' surrounded by a heater 30, a regenerator 31 and a cooler 32. The displacer 33 driven by means of a driving rod 48 moves in this cylinder. In the extension of the envelope of this displacer the working piston 34 which is driven by means of a piston rod 47 moves. The additional driving members for the piston and the displacer, i. e. the crankshaft and any means for varying the phase between the movement of the piston and that of the displacer are in this case disregarded.

The heater 30 of this motor further comprises a wall 35 which closes the contents of the cylinder in a gas-tight manner with respect to the surroundings and through which the heat must be transported. For the absorption of heat from the flame gases originating from the burner 37, the wall 35 of the heater externally includes ribs 36. During operation of the motor this heater wall 35 is heated to a high temperature to permit a temperature of 600° C. or higher in the heater. Consequently, at a high temperature this wall constitutes the weakest portion of the motor so that the average pressure occurring in the cylinder must be proportioned in accordance with the strength of this wall. The temperature of this wall is measured by a temperature responsive device such as a thermo-couple device 38 arranged in a hole of this wall. In the form of construction shown, this temperature responsive device is constituted by a thermal element the electric conductors of which are connected to an electric regulating device 43 with the interposition of a potentiometer 42. This regulating device comprises a mechanically operating portion having a lever 44 by means of which a regulating slide valve 45 may be moved to and fro in the supply conduit for the fuel of the burner 37. The sliding contact 41 of the said potentiometer 42 is operated by a movable piston of a cylinder 40 used for measurement of pressure, which cylinder communicates with the cylinder 30' of the hot-gas motor by means of a conduit with small diameter 39. The latter is proportioned so narrowly in diameter that the momentary periodic variations in pressure in the cylinder during a period of revolution of the crankshaft 60 are not transferred from the cylinder to the measuring device 40 but are retarded in the conduit 39. In the space of the measuring device there is therefore prevailing only a pressure corresponding to the average pressure of the cycle in the motor cylinder. For adjusting the motor power the crankshaft casing 50 of this motor is extended to hold a centrifugal regulator 52 which is driven by the crankshaft 60 via a shaft 49. The tension of the springs of the regulator, which serve as a compensation for the centrifugal force, is adjustable from the outside by means of a lever 54 which engages with a collar 53 on which these springs are secured. To obtain such control, the control rod 51 may connect into a device for actuating the same in order to vary the said phase. Such devices are known per se as shown, for example, in Patent No. 2,465,139 issued March 22, 1949, to F. L. Van Weenen et al. for a "Hot Gas Engine with Phase Changer" and in Patent No. 2,508,315 issued May 16, 1950, to F. L. Van Weenen et al. for a "Hot Gas Motor with Phase Changer." Since the details of construction of the phase changer form no part of the present invention, and there would be no purpose in unduly complicating the present disclosure, the phase changer device is indicated in Fig. 6 in schematic box form with an appropriate legend. This lever 54 is displaced by a handle 55 which serves to control the power of the motor. By moving the collar 53 to and fro it is possible to vary the equilibrium of the regulator at different speeds so that the power produced in the hot-gas motor is automatically adapted to the various speeds fixed by the adjustment of the power lever 55. The control of the power of the motor is effected in a known manner, for example, by having the control rod 51 connected to the regulator 52 vary the phase between movement of the piston and that of the displacer. During this portion of the power control the average pressure in the cyclic process is invariably maintained so that the device 40 for pressure measurement, does not become operative. If, now, torque must be supplied greater than that obtainable with the increase of the effective average pressure by means of the variation of the phase angle between the piston and the displacer, the amount of medium circulating in the motor is artificially increased by opening a cock 57, due to which an additional amount of gas is admitted into the cylinder with the aid of a conduit 56 leading from high pressure tank 58. Due to this step, the average pressure in the cyclic process increases as a result of which the device 40 for the control of pressure becomes operative and displaces the contact 41 of potentiometer 42 in such manner that a greater portion of the voltage of the thermal element 38 is set up at the electro-mechanical regulating device 43. Consequently, this control has the same effect as an increase in temperature of the thermal element 38 so that the control slide 45 and the fuel conduit 46 become operative and the flow of heat in the burner 37 decreases, resulting automatically in a decrease in temperature of the heater. If this greater torque is no longer required, this excessive gaseous medium may be tapped from the motor via valve 59, whereafter the device 40 for pressure control readjusts the temperature control to the initial level.

What I claim is:

1. A hot-gas motor comprising means confining the working medium thereof, heater means operatively associated with said confining means for heating a portion of said working medium confined therein, automatic means responsive to the average pressure of said working medium in said confining means for controlling the temperature of said heater means and means for maintaining the normal engine full-load speed by raising the average pressure above the full-load working pressure and compensating for the overload of the source of heat whereby the power of the motor may be made to exceed the normal full-load power.

2. A hot-gas motor comprising means confining the working medium thereof, heater means operatively associated with said confining means for heating a portion of said working medium confined therein, a heat source operatively associated with said heater means, pressure responsive means connected with said confining means and responsive to the average working medium pressure therein, and means controlled by said pressure responsive means for varying the output of said heat source.

3. A hot-gas motor comprising means confining the working medium thereof, heater means operatively associated with said confining means for heating a portion of said working medium confined therein, a heat source operatively associated with said heater means, pressure responsive means connected with said confining means and responsive to the average working medium pressure therein, temperature responsive means responsive to the temperature of a portion of said confining means, and means controlled by said pressure responsive means and said temperature responsive means for varying the output of said heat source.

4. A hot-gas motor comprising means confining the working medium thereof, heater means operatively associated with said confining means for heating a portion of said working medium confined therein, automatic means responsive to the average pressure of said working medium in said confining means for controlling the temperature of said heater means, and means other than said heater means for varying the average pressure of said working medium.

5. A hot-gas motor comprising means confining the working medium thereof, heater means operatively associated with said confining means for heating a portion of said working medium confined therein, automatic means responsive to the average pressure of said working medium in said confining means for controlling the temperature of said heater means, and means other than said heater means for varying the average pressure of said working medium, said other means being external of said confining means and connected thereto.

6. A hot-gas motor comprising means confining the working medium thereof, a reciprocable displacer in said confining means, a reciprocable piston in said confining means, heater means operatively associated with said confining means for heating a portion of said working medium confined therein, automatic means responsive to the average pressure of said working medium in said confining means for controlling the temperature of said heater means, a common crank-shaft, first coupling means coupling said displacer to said crank-shaft, second coupling means coupling said piston to said crank-shaft, and means for varying the phase relationship between said displacer and said piston.

7. A hot-gas motor as claimed in claim 6 wherein there are additional means responsive to the speed of rotation of said crankshaft for actuating the said means for varying the phase relationship between said displacer and said piston.

8. A hot-gas motor comprising means confining the working medium thereof, a reciprocable displacer in said confining means, a reciprocable piston in said confining means, heater means operatively associated with said confining means for heating a portion of said working medium confined therein, automatic means responsive to the average pressure of said working medium in said confining means for controlling the temperature of said heater means, a common crank-shaft, first coupling means coupling said displacer to said crank-shaft, second coupling means coupling said piston to said crank-shaft, means for varying the phase relationship between said displacer and said piston, additional means responsive to the speed of rotation of said crank-shaft for actuating the said means for varying the phase relationship between said displacer and said piston, and further means for varying the responsivity of said additional means.

WILLEM JAN van HEECKEREN.

REFERENCES CITED

The following references are of record in the file of this patent:

UNITED STATES PATENTS

| Number | Name | Date |
| --- | --- | --- |
| 289,482 | Wilcox | Dec. 4, 1883 |
| 1,128,860 | Engel et al. | Feb. 16, 1915 |
| 2,219,147 | Binder et al. | Oct. 22, 1940 |
| 2,250,946 | Brown et al. | July 29, 1941 |
| 2,385,060 | Chapman | Sept. 18, 1945 |